United States Patent
Nagami et al.

(10) Patent No.: US 7,967,727 B2
(45) Date of Patent: Jun. 28, 2011

(54) CLUTCH CONTROL DEVICE

(75) Inventors: Kiyoshi Nagami, Anjo (JP); Yoshio Umemura, Anjo (JP); Makoto Hashizume, Tokai (JP); Takashi Kato, Anjo (JP)

(73) Assignee: Aisin AW Co., Ltd., Anjo-shi, Aichi-ken (JP)

( * ) Notice: Subject to any disclaimer, the term of this patent is extended or adjusted under 35 U.S.C. 154(b) by 317 days.

(21) Appl. No.: 12/318,200

(22) Filed: Dec. 23, 2008

(65) Prior Publication Data
US 2009/0247363 A1 Oct. 1, 2009

(30) Foreign Application Priority Data

Mar. 31, 2008 (JP) ................................. 2008-093355

(51) Int. Cl.
*B60W 10/02* (2006.01)
(52) U.S. Cl. ..................... 477/180; 192/103 F
(58) Field of Classification Search .......................... None
See application file for complete search history.

(56) References Cited

U.S. PATENT DOCUMENTS

| 5,627,750 A | 5/1997 | Kono et al. | 364/424.096 |
| 5,749,061 A | 5/1998 | Kono et al. | 701/68 |
| 5,807,209 A | 9/1998 | Matsubara et al. | 477/176 |
| 6,652,415 B2 * | 11/2003 | Segawa et al. | 477/62 |
| 6,733,299 B2 * | 5/2004 | Eguchi et al. | 477/176 |
| 7,085,640 B2 * | 8/2006 | Segawa et al. | 701/67 |

FOREIGN PATENT DOCUMENTS

| JP | 08-028685 | 2/1996 |
| JP | 09-060719 | 3/1997 |
| JP | 10-246322 | 9/1998 |
| JP | 2985102 | 1/1999 |

* cited by examiner

*Primary Examiner* — Justin Holmes
(74) *Attorney, Agent, or Firm* — Bacon & Thomas, PLLC (57) ABSTRACT

An oil pressure command value for slip-control of a lock-up clutch of a torque converter is calculated based on a feed-forward oil pressure value calculated by an FF value calculating unit and a feed-back oil pressure value calculated by a feedback value calculating unit. When the feedback oil pressure value is calculated, a deviation out-of-range determining unit determines whether a deviation between actual rotational speed difference and target rotational speed difference is outside of a predetermined range. If the deviation is outside of the predetermined range, a feedback value correcting unit calculates a correction value and corrects the feedback oil pressure value. Therefore, when the deviation is outside of the predetermined range, the actual rotational speed difference is brought into convergence with the target rotational speed difference with rapid response. When the deviation falls within the predetermined range, normal feedback control is adopted to assure stability without overshooting, even in a high engine speed, high engine torque state.

8 Claims, 10 Drawing Sheets

| TURBINE ROTATIONAL SPEED Nt | Nta | Ntb | Ntc | Ntd | Nte | Ntf | Ntg | Nth |
|---|---|---|---|---|---|---|---|---|
| INTEGRAL CORRECTION OIL PRESSURE VALUE B | -50 | -50 | -50 | -100 | -100 | -100 | -150 | -150 |
| INTEGRAL CORRECTION OIL PRESSURE VALUE A | 50 | 50 | 50 | 100 | 100 | 100 | 150 | 150 |

CLUTCH CONTROL DEVICE

INCORPORATION BY REFERENCE

The disclosure of Japanese Patent Application No. 2008-093355 filed on Mar. 31, 2008 including the specification, drawings and abstract is incorporated herein by reference in its entirety.

BACKGROUND OF THE INVENTION

1. Field of the Invention

The present invention relates to a control device for a lock-up clutch of a vehicle torque converter and for a clutch in a starting device or the like that does not use a hydraulic power transmission such as a torque converter. More particularly, the present invention relates to a control device for controlling clutch slip, i.e. controlling a clutch in a state of slipping or "slip state".

2. Description of the Related Art

In general, an automatic transmission mounted in a vehicle or the like includes a hydraulic power transmission such as a torque converter for providing power transmission while absorbing a rotational speed difference between output rotation of an engine and input rotation of an automatic speed change mechanism, in order to prevent engine stoppage ("killing the engine") upon stopping or starting of the vehicle. Such a hydraulic power transmission necessarily produces a rotation transmission loss after starting of the vehicle in motion. For improved fuel economy and the like, providing a lock-up clutch capable of locking the output shaft of the engine with the input shaft of the automatic speed change mechanism (that is, locking the pump impeller to the turbine runner of a hydraulic power transmission) has become conventional.

Engagement control of the lock-up clutch, not only includes control of lock-up but also so-called slip control, that is, maintaining a slip state in order to implement both improved fuel economy and riding comfort (reduced engagement shock). The slip control state exists during the ON/OFF transition period of the lock-up clutch. In this slip control, it is preferable, from the viewpoint of reduction of engine vibration transmission and prevention of variation in transmitted torque, to control the amount of slip by controlling a supplied oil pressure so that the rotational speed difference between the output shaft of the engine and the input shaft of the automatic speed change mechanism equals a desired target value. However, accelerator operation by a driver is not necessarily always constant and, when the engine torque varies, it is difficult to control the amount of slip at a target value simply by feedback control only.

In view of the above problem, slip control has been proposed in which, not only is a feedback value calculated based on a target rotational speed difference and an actual rotational speed difference, but also a feed-forward value based on an engine torque is calculated, and slip control is performed using the sum of the feed-forward value and the feedback value (see Japanese Patent No. 2985102). Slip control using an H X controller has also been proposed in which a property change due to a transient operating state (disturbance) is approximated with a high-order function and design of constants of two weighting functions for response and stability is optimized (see Japanese Patent No. 3098667).

In recent years, slip control in a higher engine speed, higher engine torque region has been demanded for control of the lock-up clutch, in addition to that provided during the ON/OFF transition period of the lock-up described above, i.e. during shifting of an automatic speed change mechanism or the like in order to reduce shift shock.

However, at such a higher engine speed, in a higher engine torque region, sensitivity of actual rotational speed difference to an oil pressure value based on variation in engine speed and variation in torque, is relatively small as compared to that at a low engine speed, low engine torque region. Therefore, even if slip control is conducted as taught in Japanese Patent No. 2985102 or Japanese Patent No. 3098667, a delay (lag time) of about several seconds will occur before the amount of slip converges with a target value dependent on variation in engine output, making such control impractical. In actual applications, therefore, slip control is prohibited when the engine speed reaches a predetermined upper limit or when the torque reaches a predetermined upper limit.

SUMMARY OF THE INVENTION

Accordingly, it is an object of the present invention to provide a clutch control system that enables slip control that is both highly responsive and stable, even in a high engine speed, high engine torque state.

The present invention (see FIGS. 1 through 10) provides a clutch control system that provides slip control by hydraulically controlling engagement of a clutch provided between an output shaft of an engine and an input shaft of an automatic speed change mechanism, based on an oil pressure command value. The clutch control system includes: an actual rotational speed difference detecting unit that detects an actual rotational speed difference between the rotational speed of the output shaft of the engine and the rotational speed of the input shaft of the automatic speed change mechanism; a target rotational speed difference setting unit that sets a target rotational speed difference between the rotational speed of the output shaft of the engine and the rotational speed of the input shaft of the automatic speed change mechanism; a feedback value calculating unit that calculates a feedback oil pressure value from a deviation between the actual rotational speed difference and the target rotational speed difference; a deviation out-of-range determining unit that determines whether the deviation between the actual rotational speed difference and the target rotational speed difference is outside of a predetermined range; a feedback value correcting unit that, responsive to a determination that the deviation is outside of the predetermined range by the deviation out-of-range determining unit, sets a correction value and corrects the feedback oil pressure value by the correction value; and an oil pressure command unit that generates the oil pressure command value based on the feedback oil pressure value corrected by the correction value.

In the above system, when it is determined that the deviation between the target rotational speed difference and the actual rotational speed difference is outside of the predetermined range, the feedback value correcting unit sets a correction value and corrects the feedback oil pressure value by the correction value. Therefore, when the actual rotational speed difference is outside of the predetermined range of the target rotational speed difference, the feedback oil pressure value is corrected until the actual rotational speed difference falls within the predetermined range. The actual rotational speed difference can therefore be rapidly brought closer to the target rotational speed difference. When the actual rotational speed difference falls within the predetermined range for the target rotational speed difference, control is switched to normal feedback control by the feedback value calculating unit in order to assure stability, i.e. to avoid overshooting. As a result, both fast responsiveness and stability can be achieved even at, for example, a high engine speed, high engine torque region, enabling slip control that can be used in practical applications.

Further, in the clutch control system (for example, see FIGS. 1, 2, and 5), when it is determined that the deviation is outside of the predetermined range, the feedback value correcting unit sets the correction value by adding a present correction value to a previous correction value every time the feedback value calculating unit calculates the feedback oil pressure value.

When it is determined that the deviation is outside of the predetermined range, because the feedback value correcting unit sets the correction value by adding the present correction value to the previous correction value every time the feedback value calculating unit calculates the feedback oil pressure value, the correction value is accumulated. In other words, the oil pressure command value follows an upward or downward gradient.

Thus, in the clutch control system of the present invention, the feedback value correcting unit raises the present (set) correction value as the rotational speed of the input shaft of the automatic speed change mechanism becomes higher and, therefore, rapidity of responsiveness in slip control is improved.

Optionally, the clutch control system (for example, see FIGS. 1, 2, 3, and 4) may further include a feed-forward value calculating unit that calculates a feed-forward oil pressure value based on the rotational speed of the input shaft of the automatic speed change mechanism, the target rotational speed difference, and the output torque of the engine. The oil pressure command unit generates the oil pressure command value by adding the feed-forward oil pressure value to the feedback oil pressure value corrected by the correction value. Therefore, the actual rotational speed difference more rapidly changes to coincide with the target rotational speed difference.

In one preferred embodiment, the clutch control system (for example, see FIGS. 1, 2, 3, and 8) further includes a feed-forward value learning unit that converts the correction value, that has been set responsive to a determination by the deviation out-of-range determining unit that a deviation which was outside of the predetermined range has moved to within the predetermined range, to a next feed-forward oil pressure value calculated by the feed-forward value calculating unit. Therefore, the actual deviation will fall within the predetermined value from the beginning of slip control, according to the feed-forward oil pressure value obtained by learning of the oil pressure command value and conformance of the actual rotational speed difference with the target rotational speed difference is significantly improved.

DETAILED DESCRIPTION OF THE PREFERRED EMBODIMENTS

A preferred embodiment of the present invention will now be described with reference to FIGS. 1 through 10.

Figure 1:
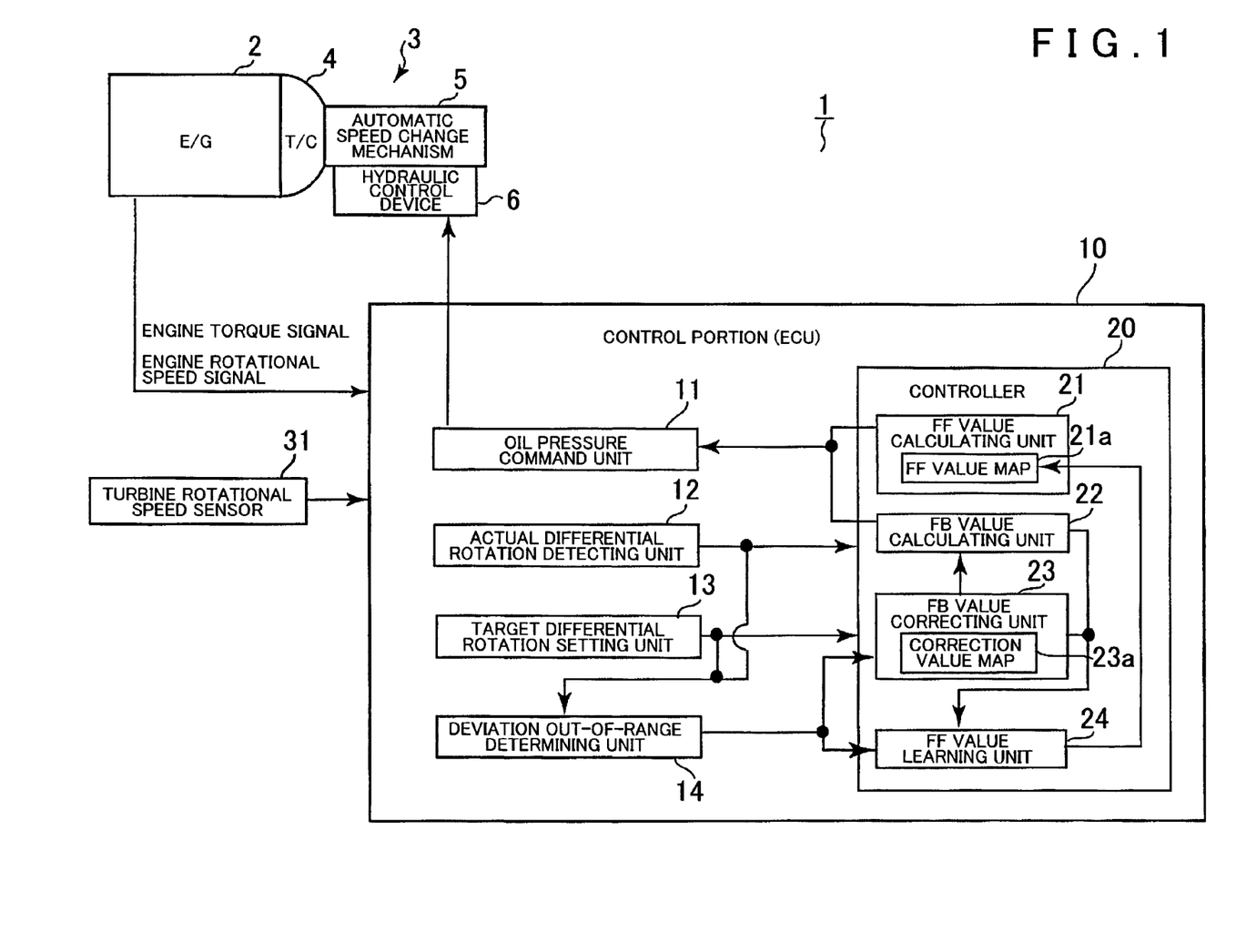
FIG. 1 is a block diagram of a preferred embodiment of a clutch control system according to the present invention.
Figure 2:
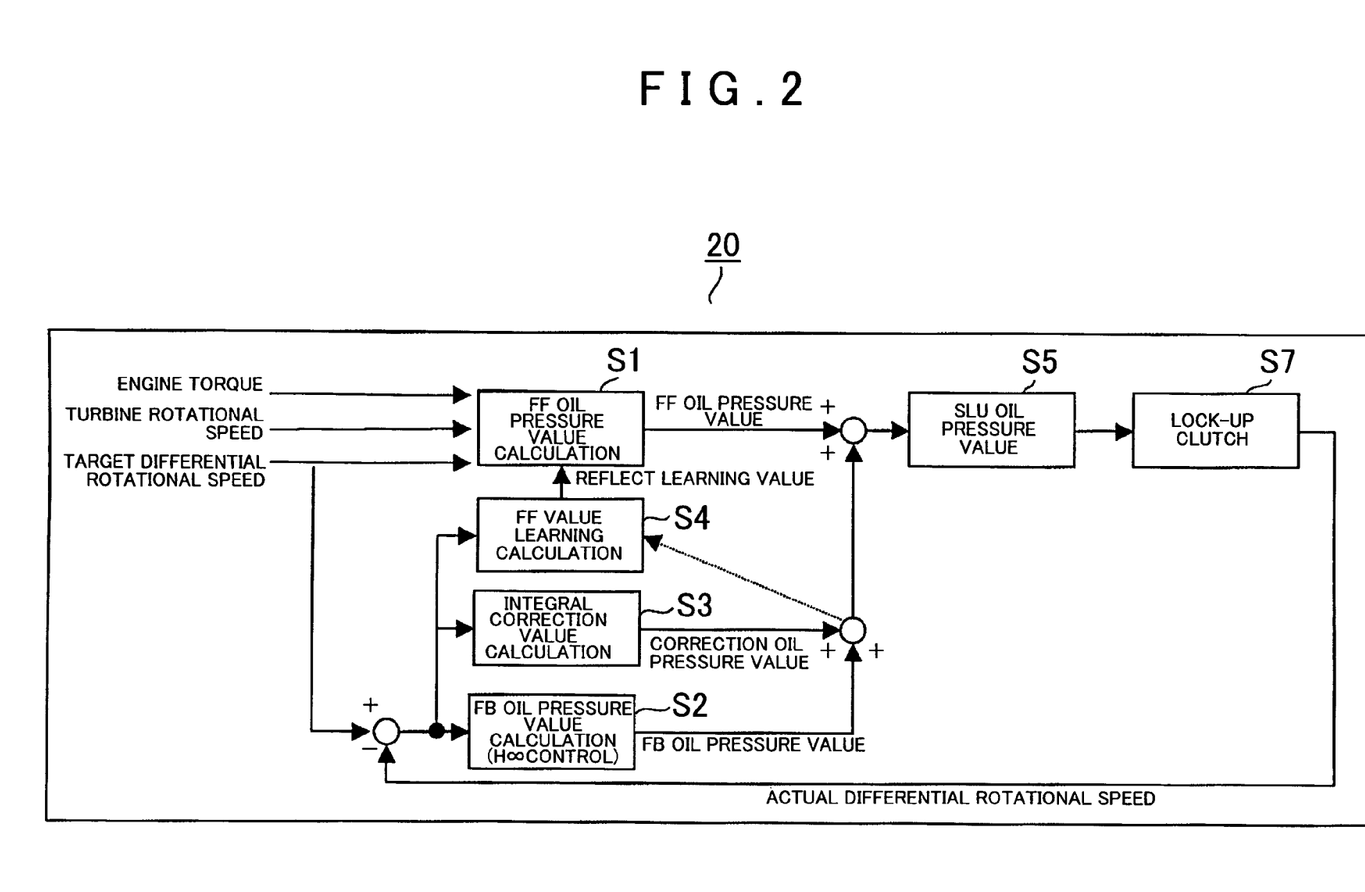
FIG. 2 is a block diagram of the controller in the embodiment of FIG. 1.

First, a hydraulic control circuit of the present invention will be described with reference to FIG. 1 and FIG. 10. As shown in FIG. 1, an automatic transmission 3, connected to an engine 2, generally includes a torque converter 4, an automatic speed change mechanism 5, and a hydraulic control device 6. The torque converter 4 is provided between the output shaft of the engine 2 and the input shaft of the automatic speed change mechanism 5.

Figure 10:
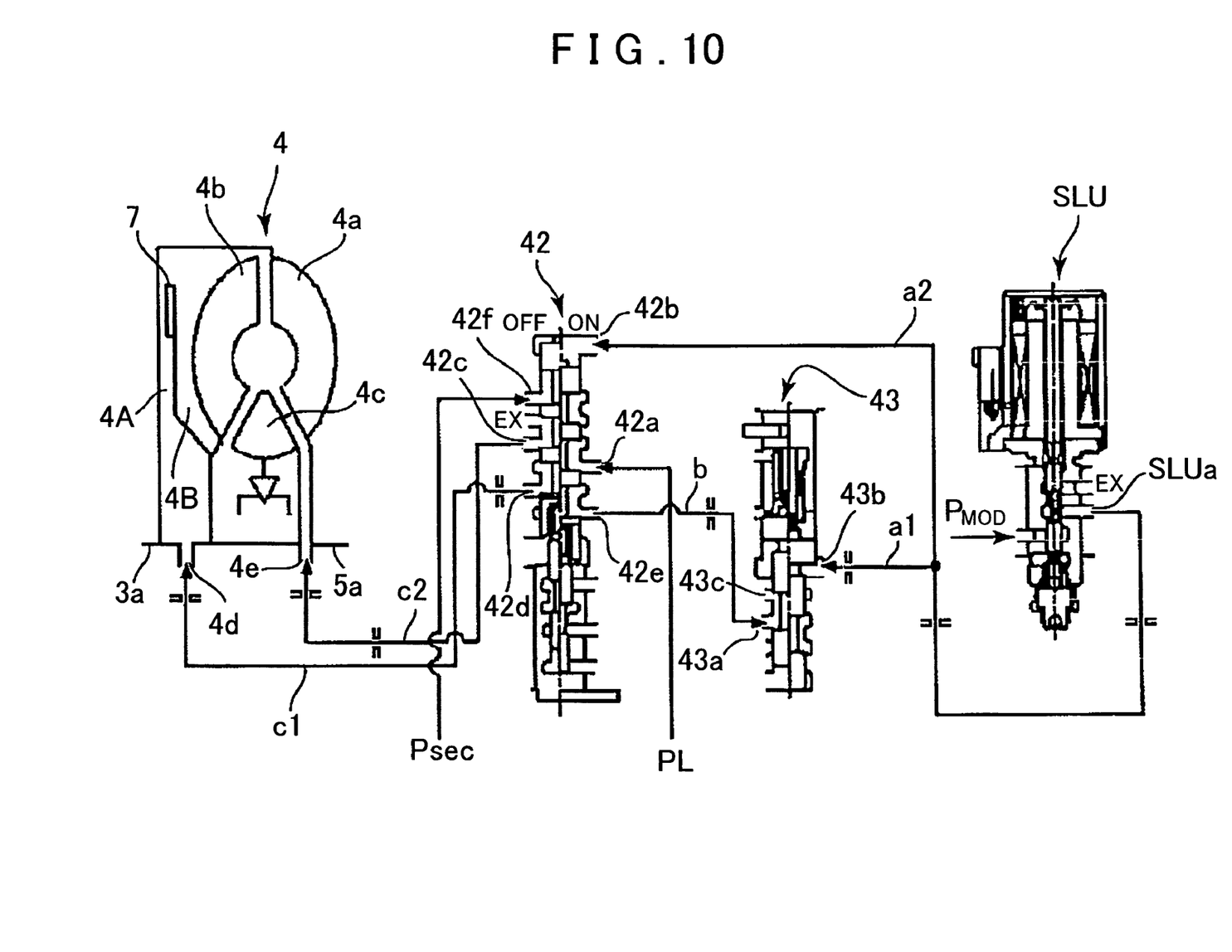
FIG. 10 is a diagram of a part of a lock-up clutch hydraulic control circuit which can be utilized in the present invention.

As shown in FIG. 10, the torque converter 4 has a pump impeller 4a connected to an input shaft 3a (i.e., the output shaft of the engine 2) of the automatic transmission 3, a turbine runner 4b to which rotation of the pump impeller 4a is transmitted through a working fluid, and a stator 4c which is provided between the pump impeller 4a and the turbine runner 4b which is restricted to rotation in one direction by a one-way clutch supported by the case (not shown). The turbine runner 4b is connected to the input shaft 5a of the automatic speed change mechanism 5 which is coaxial with the input shaft 3a. The torque converter 4 includes a lock-up clutch 7 which is a main component of the system of the present invention. The input shaft 3a of the automatic transmission 3 and the input shaft 5a of the automatic speed change mechanism 5 are coupled to each other when the lock-up clutch 7 provided between the input shaft 3a and the input shaft 5a is engaged responsive to an oil pressure supplied through oil passages 4d, 4e, as described later in detail.

The rotation transmitted to the input shaft 5a is changed in speed or reversed by the automatic speed change mechanism 5 according to the traveling state and then transmitted to drive wheels (not shown) through a differential device. Any multi-stage automatic transmission or belt-type continuously variable transmission (CVT) may be used as the automatic speed change mechanism 5 of the present invention.

The hydraulic control device 6 of the automatic transmission 3 includes, for example, an oil pump (not shown) connected to the pump impeller 4a. The oil pressure generated by the oil pump is adjusted to a line pressure $P_L$ and a secondary pressure $P_{sec}$ in accordance with, respectively, throttle opening of a primary regulator valve and a secondary regulator valve (not shown). A modulator pressure $P_{MOD}$, that is, the line pressure $P_L$ adjusted to a constant value by a modulator value or the like (not shown), is supplied to a linear solenoid valve SLU for controlling the lock-up clutch 7.

When the control portion (ECU) 10 determines that the lock-up clutch is OFF, such as in starting of a vehicle in motion, the linear solenoid valve SLU is turned OFF responsive to an electric command of an oil pressure command unit 11. As a result, no control pressure $P_{SLU}$ is output from the output port SLUa of the linear solenoid valve SLU to oil passages a1, a2, and the lock-up relay valve 42 is switched to its OFF position (the left half position in FIG. 10). The secondary pressure Psec supplied to port 42f is then output from a port 42d and supplied from the lock-up OFF oil passage 4d into the torque converter 4 through an oil passage c1. The secondary pressure Psec thus supplied causes the oil pressure in the space 4A to exceed the oil pressure in the space 4B, and the lock-up clutch 7 is thus moved to the right in the figure, into a disengaged state. The secondary pressure Psec supplied into the torque converter 4 circulates within the torque converter 4, while hydraulically transmitting force from the pump impeller 4a to the turbine runner 4b, and is discharged from the lock-up ON oil passage 4e back into a port 42c and then discharged from a drain port EX.

On the other hand, when the control portion 10 determines that the lock-up is ON, such as when the vehicle is in a constant-speed running state, the linear solenoid valve SLU is turned ON responsive to an electric command from the oil pressure command unit 11 and the control pressure $P_{SLU}$ is output from the output port SLUa to the oil passages a1, a2 while being regulated as described later. The lock-up relay valve 42 is then switched to an ON position (the right half position in FIG. 10) and the lock-up control valve 43 is controlled by the control pressure $P_{SLU}$ applied to oil chamber 43b. In this state, the line pressure $P_L$ applied to port 42a of the lock-up relay valve 42 is supplied from the port 42c to the lock-up ON oil passage 4e through an oil passage c2. The line pressure $P_L$ thus supplied causes the oil pressure in the space 4B to exceed the oil pressure in the space 4A, and that pressure differential forces the lock-up clutch 7 to the left in the figure and gradually into an engaged state.

The flow of the line pressure $P_L$ to the torque converter 4 is gradually stopped as the lock-up clutch 7 is engaged. Space 4A communicates with a port 43a through the lock-up OFF oil passage 4d, the oil passage c1, the port 42d, and a port 42e. The oil pressure discharged from port 43c is regulated by the control pressure $P_{SLU}$ of the lock-up control valve 43. In other words, a pressure differential between the two spaces 4A, 4B, on opposite sides of by the lock-up clutch 7, is controlled by the control pressure $P_{SLU}$ from the linear solenoid valve SLU so as to control the engagement of the lock-up clutch 7 to produce either a slip state or a completely engaged state.

As shown in FIG. 1, a lock-up clutch control system 1 has the control portion 10 connected to the automatic transmission 3. The control portion 10 includes the oil pressure command unit 11, an actual rotational speed difference detecting unit 12, a target rotational speed difference setting unit 13, a deviation out-of-range determining unit 14, and a controller 20. The controller 20 includes a feed-forward (hereinafter, also referred to as "FF") value calculating unit (FF controller) 21 having a FF value map 21a, a feedback (hereinafter, also referred to as "FB") value calculating unit (FB controller) 22, a FB value correcting unit 23 having correction value maps 23a, and a FF value learning unit 24.

A turbine rotational speed (input shaft) sensor 31 for detecting a rotational speed Nt of the turbine runner 4b, that is, a rotational speed of the input shaft 5a of the automatic speed change mechanism 5, is connected for input to the control portion 10. Engine torque (output torque of the engine) Te and engine speed (rotational speed of the output shaft of the engine) Ne are input as signals from the engine 2 to the control portion 10. Note that the turbine rotational speed Nt may be calculated from a gear ratio or the like and the detected rotational speed of an output shaft (not shown) of the automatic speed change mechanism 5. The engine speed Ne may be detected by, for example, providing an input shaft rotational speed sensor in the automatic transmission 3.

The actual rotational speed difference detecting unit 12 detects an actual rotational speed difference Ns by subtracting the turbine rotational speed Nt from the engine speed Ne. The target rotational speed difference setting unit 13 sets a target rotational speed difference TgNs, that is, a target slip rotational speed difference for the lock-up clutch 7 (e.g., 50 to 100 rpm), based on the running state, i.e., the engine torque Te, the turbine rotational speed Nt, or the like. The deviation out-of-range determining unit 14 calculates a deviation e between the actual rotational speed difference and the target rotational speed difference and determines whether or not the deviation e is outside of a predetermined range ($A \geq e \geq B$), between a predetermined value A (e.g., +50 rpm) and a predetermined value B (−50 rpm), which is described later.

Calculation by the controller 20 of an oil pressure command value for slip control oil pressure will now be described. For example, when the control portion 10 determines, based on the running state, a need for slip control of the lock-up clutch 7, execution of the main program of FIG. 3 is started (S10), and the routine proceeds to an FF oil pressure value calculation subroutine S20 shown in FIG. 4, where the FF value calculating unit 21 calculates an FF oil pressure value $P_{FF}$ (S21 of FIG. 4).

Figure 4:
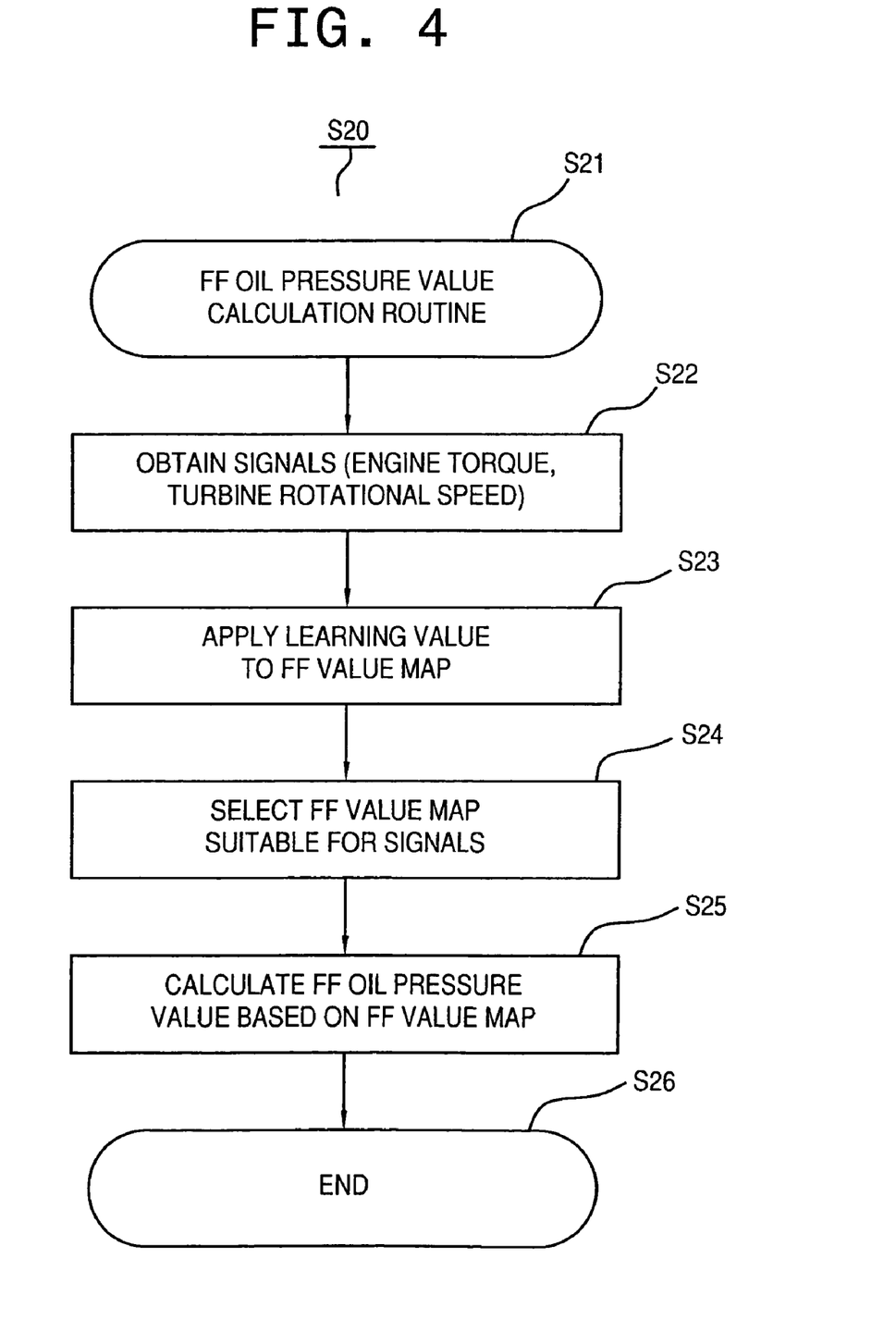
FIG. 4 is a flowchart of a subroutine for feed-forward oil pressure value calculation in the program of FIG. 3, i.e. step S20.

The FF value calculating unit 21 first obtains a signal for the engine torque Te from the engine 2, a signal for the turbine rotational speed Nt from the turbine rotational speed sensor 31, and a signal for the target rotational speed difference TgNs from the target differential rational speed setting unit 13 (S22). Next, a learning value (see FIG. 8) that is output from the FF value leaning unit 24, described in more detail later, is obtained from a FF value map 21a (S23). The FF value map 21a is actually a plurality of maps according to, for example, different magnitudes of engine torque Te. The FF value calculating unit 21 selects an appropriate map from the FF value maps 21a according to the received signal (S24). Based on the selected map, the FF value calculating unit 21 then calculates, in accordance with the turbine rotational speed Nt, an FF oil pressure $P_{FF}$ (oil pressure command value) to be supplied to the linear solenoid valve SLU, in order to control an oil pressure to correspond to the target rotational speed difference TgNs of the lock-up clutch 7 (see S1 in FIG. 2) and the routine ends (S26).

Figure 3:
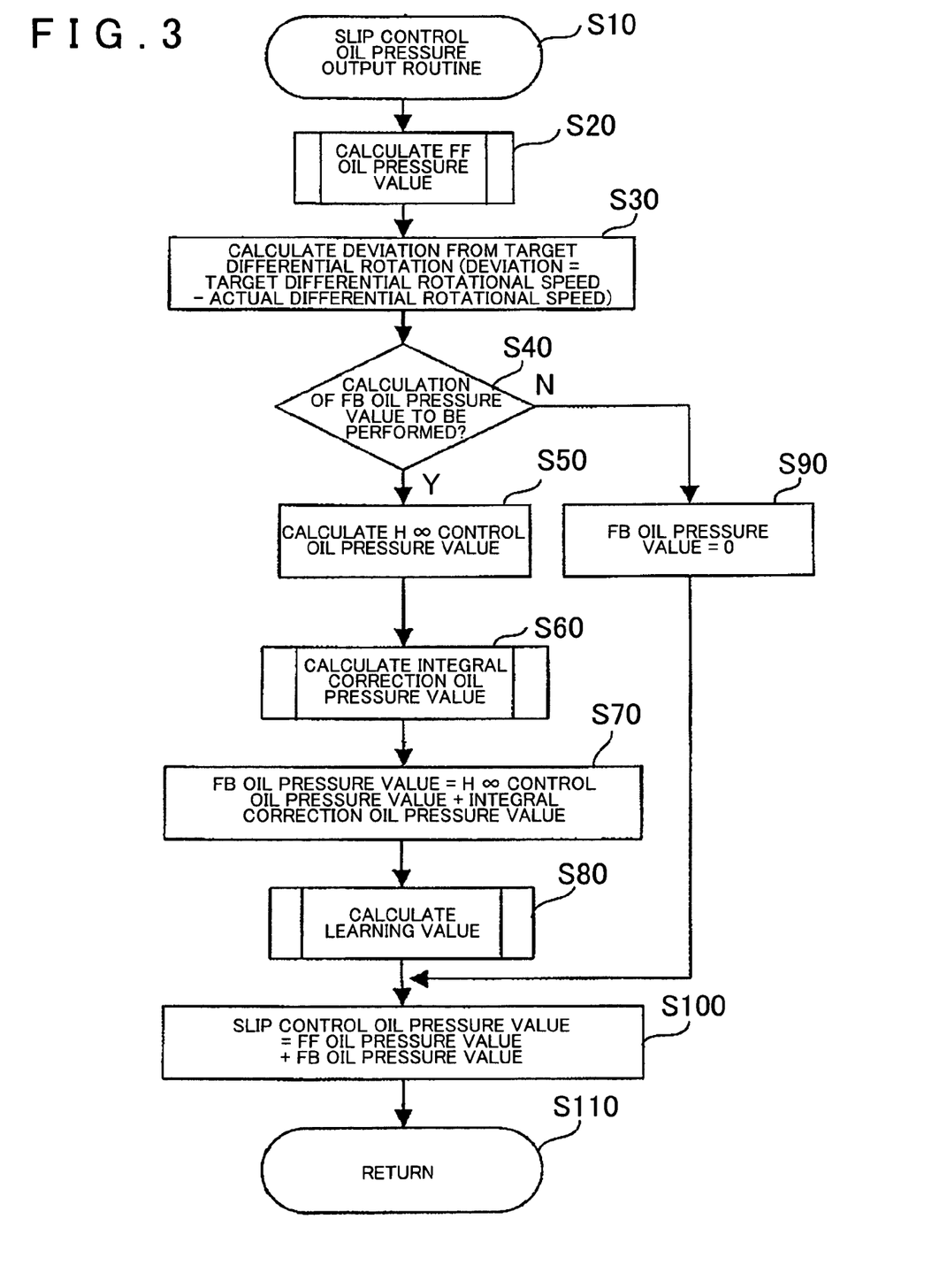
FIG. 3 is a flowchart of the main slip control program according to the present invention.

After the FF oil pressure value $P_{FF}$ is thus calculated, as shown in FIG. 3, deviation of the actual rotational speed difference Ns from the target rotational speed difference TgNs is calculated (S30). The control portion 10 then determines whether or not an FB oil pressure value $P_{FB}$ is to be calculated (S40). For example, during starting of the slip control, during movement of the friction plate of the lock-up clutch 7 toward contact, and during a transition period in which the target rotational speed difference TgNs is changed according to change in the engine torque Te and a change in the engine speed Ne responsive to an operation of the accelerator by the driver, responsiveness to the feedback control is poor and calculation and use of an FB oil pressure value $P_{FB}$ therefore has little effect. Accordingly, the FB oil pressure value $P_{FB}$ is not calculated (No in S40), the FB oil pressure value $P_{FB}$ is set to 0 (S90), and a slip control oil pressure value $P_{SLU}$, for controlling the linear solenoid valve SLU, is calculated based only on the FF oil pressure value $P_{FF}$ calculated as described above.

On the other hand, if the control portion 10 determines that, for example, the target rotational speed difference TgNs is no longer in the transition period and has become stable, the control portion 10 determines that the FB oil pressure value $P_{FB}$ is to be calculated (Yes in S40), and the routine proceeds to step S50. The FB value calculating unit 22, functioning as an FB controller providing H ∞ (infinity) control, calculates an FB oil pressure value (H ∞ control oil pressure value) $P_{FB}$ based on a control formula having a constant determined so as to achieve both responsiveness and stability based on an H ∞ norm (see S2 in FIG. 2) (see, for example, Japanese Patent No. 3098667). While in the present embodiment, a controller providing H ∞ control is shown as the FB controller, the present invention is not so limited, and an FB controller providing PID control may be used instead.

Figure 5:
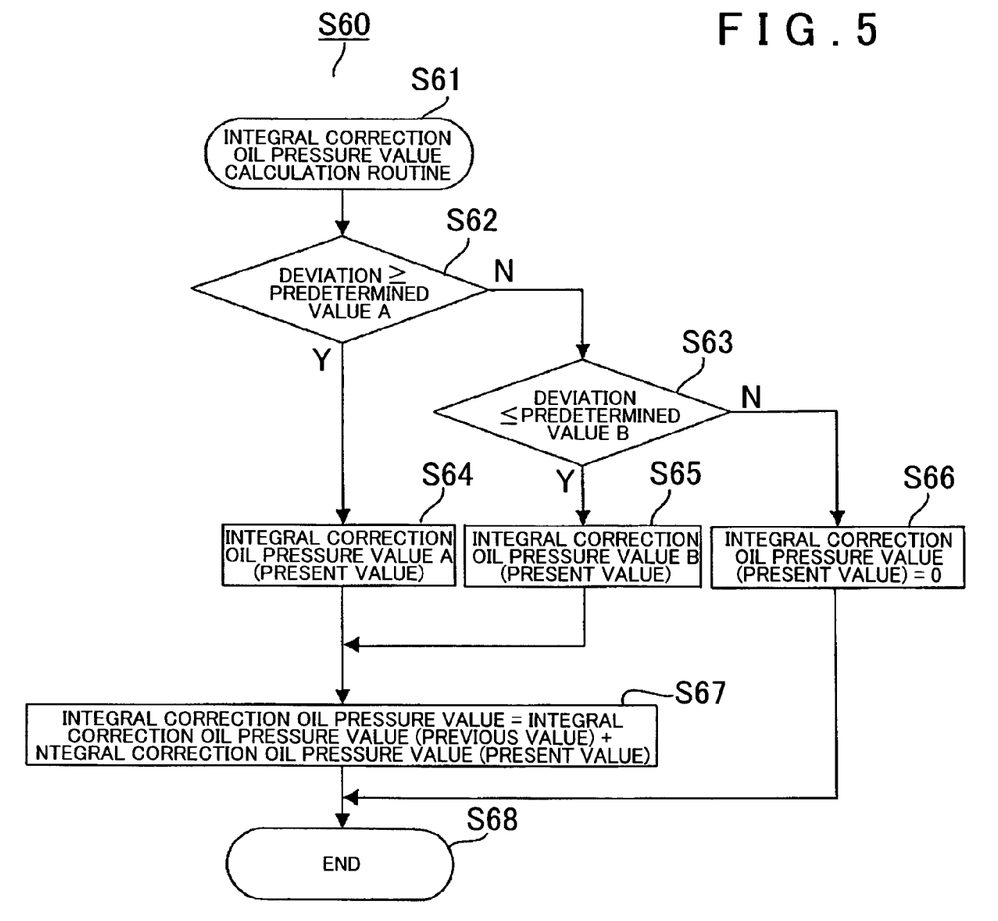
FIG. 5 is a flowchart of a subroutine for integral correction oil pressure value calculation in the program of FIG. 3, i.e. step S60.

After calculation of the FB oil pressure value $P_{FB}$ is completed as described above, the routine proceeds to an integral correction oil pressure value calculation routine S60 shown in FIG. 5, and the FB value correcting unit 23 starts calculation of an integral correction oil pressure value (correction value) $P_{FBir}$ (S61 in FIG. 5). First, the deviation out-of-range determining unit 14 determines whether or not the deviation e between the target rotational speed difference TgNs and the actual rotational speed difference Ns is equal to or less than the predetermined value A (e.g., +50 rpm) (S62). If the deviation e is equal to or less than the predetermined value A, the deviation out-of-range determining unit 14 further determines whether or not the deviation e is equal to or larger than the predetermined value B (e.g., −50 rpm) (S63). In other words, the deviation out-of-range determining unit 14 determines whether or not the deviation e is within the predetermined range.

If the deviation e is within the predetermined range (A≧e≧B) ("No" in S62, "No" in S63), the actual rotational speed difference Ns has somewhat converged with the target rotational speed difference TgNs. Therefore, the actual rotational speed difference Ns should converge with the target rotational speed difference TgNs and become stable solely by application of the FB control by the FB value calculating unit 22. Within the predetermined range (A≧e≧B) further control by application of the integral correction oil pressure value $P_{FBir}$ may adversely affect stability of the FB control and cause overshooting. Therefore, the integral correction oil pressure value $P_{FBir}$ is set to 0 (S66) and the routine ends (S68).

As shown in FIG. 3, in step S70, no correction is applied to the FB oil pressure value (H ∞ control oil pressure value) $P_{FB}$ calculated in step S50. Thereafter, in step S100, the sum of the FF oil pressure value $P_{FF}$ and the FB oil pressure value $P_{FB}$ calculated as described above is generated as a control oil pressure value $P_{SLU}$, applied by the oil pressure command unit 11 to control the linear solenoid valve SLU. The routine then returns (S110) and proceeds to the next routine.

On the other hand, if the deviation e is determined to be outside of the predetermined range (A≧e≧B) in steps S62, S63, the FB value correcting means 23 refers to a correction value map 23a. If the deviation e is equal to or larger than the predetermined value A, an integral correction oil pressure value A is obtained (S64). If the deviation e is equal to or less than the predetermined value B, an integral correction oil pressure value B is obtained (S65).

Figure 6:
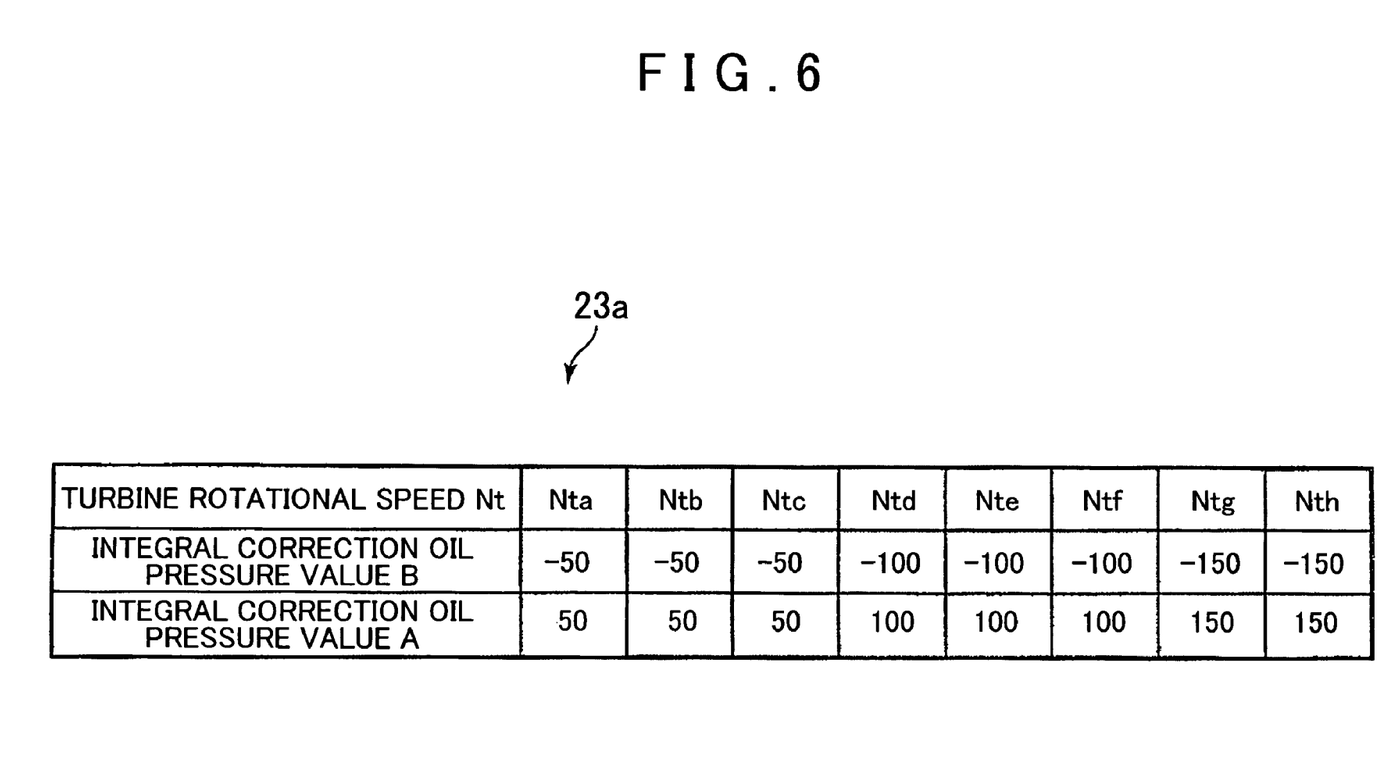
FIG. 6 is a correction value map.

In other words, if the deviation e is equal to or larger than the predetermined value A (Yes in S62), the actual rotational speed difference Ns (e.g., 150 rmp or more) is larger than the sum of the target rotational speed difference TgNs (e.g., 100 rpm) and the predetermined value A (e.g., +50 rpm). Since the amount of slip is too large, a present integral correction oil pressure (positive) value A, for adding to the previous value to obtain the control oil pressure value $P_{SLU}$ is selected according to the value of the turbine rotational speed Nt detected by the turbine rotational speed sensor 31, as shown in FIG. 6.

If the deviation e is equal to or less than the predetermined value B that is a lower limit in the negative direction (Yes in S63), on the other hand, the actual rotational speed difference Ns (e.g., 50 rpm or less) is less than a value obtained by subtracting the predetermined value B (e.g., −50 rpm) from the target rotational speed difference TgNs (e.g., 100 rpm). Since the amount of slip is too small, a negative present integral correction oil pressure value B, for subtracting from the previous value to obtain the control oil pressure value $P_{SLU}$, is selected in accordance with the value of the turbine rotational speed Nt detected by the turbine rotational speed sensor 31, as shown in FIG. 6.

The predetermined value A (the upper limit of the predetermined range) and the predetermined value B (the lower limit value of the predetermined range) may have the same absolute value (e.g., ±50 rpm) or may have different absolute values (e.g., −80 rpm to −30 rpm). The predetermined values A and B may be varied according to the value of the target rotational speed difference TgNs.

Figure 7A:
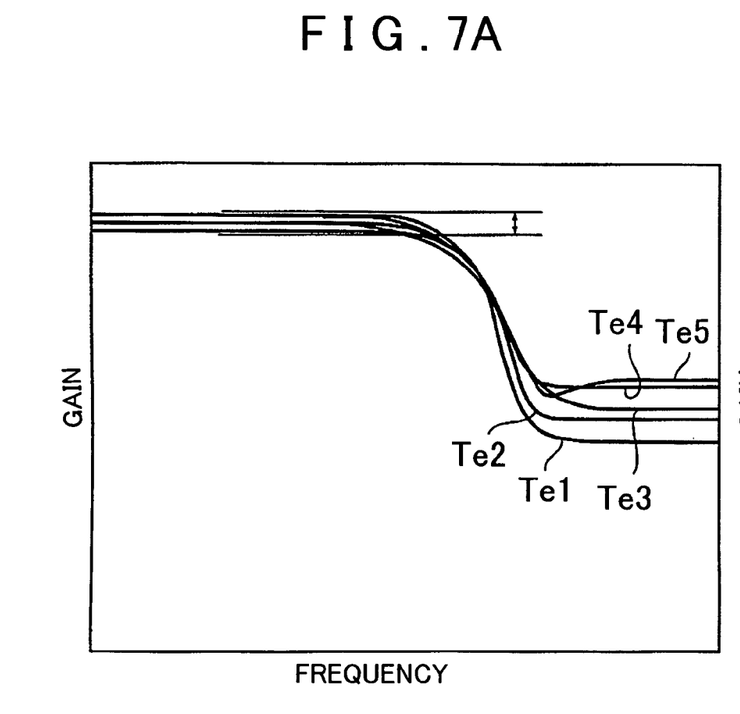
FIG. 7A is a diagram of frequency response of a feedback controller when engine torque is varied and FIG. 7B is a diagram of frequency response of a feedback controller when turbine rotational speed is varied.
Figure 7B:
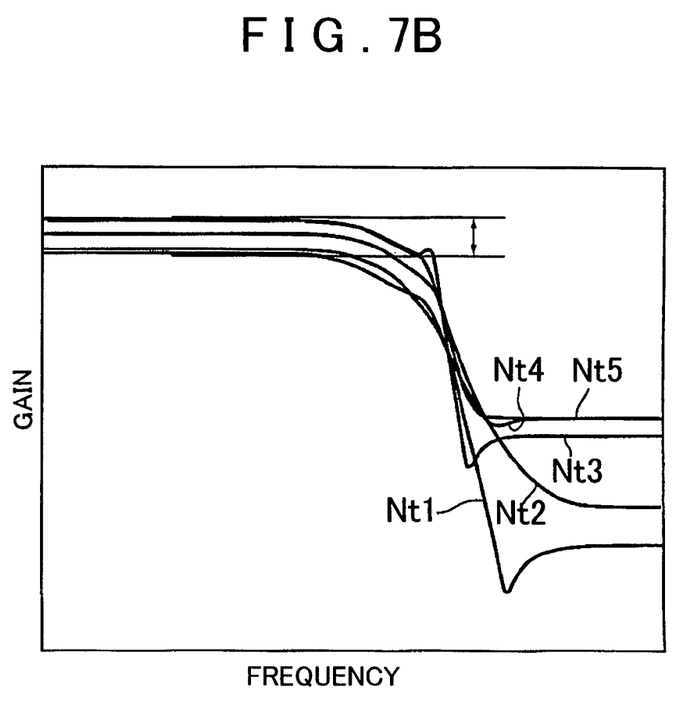

As shown in FIG. 7A, frequency response was examined for five different engine torques Te, that is, Te1, Te2, Te3, Te4, and Te5, with the turbine rotational speed maintained at a constant value (e.g., 1,000 rpm). The results of this test show that a gain (the control oil pressure value $P_{SLU}$/the actual rotational speed difference Ns) fluctuates within a small range, especially in a frequency region in which the frequency response is stable. As shown in FIG. 7B, on the other hand, frequency response was examined for five different turbine rotational speeds Nt, that is, Nt1, Nt2, Nt3, Nt4, and Nt5, with the engine torque maintained at a constant value (e.g., 100 Nm). This test showed that a gain fluctuates over a large range in the frequency region in which the frequency response is stable. Thus, the frequency response is largely dependent on the turbine rotational speed Nt.

In view of the above, in the present embodiment, the correction value map 23a shown in FIG. 6 is set so that the integral correction oil pressure values A, B become larger as the turbine rotational speed Nt become higher (Nta<Ntb<Ntc<Ntd<Nte<Ntf<Ntg<Nth). In other words, the response to the actual rotational speed difference Ns is poor with control by change of the integral correction oil pressure value $P_{FBir}$ in accordance with engine toque Te. However, conformance with the actual rotational speed difference Ns is improved by increasing the integral correction oil pressure values A, B in accordance with an increase in the turbine rotational speed Nt and responsiveness in slip control is thereby improved.

By thus setting the present integral correction oil pressure value $P_{FBir}$ in steps S64 and S65, the FB value correcting unit 23 uses the present integral correction oil pressure value $P_{FBir}$ directly as an integral correction oil pressure value $P_{FBir}$ in the first execution of the control loop of FIG. 3. Each time the routine of FIG. 3 is repeated thereafter, and the FB oil pressure value $P_{FB}$ is calculated in step S50, the FB value correcting unit 23 adds the present integral correction oil pressure value $P_{FBir}$ to the previous integral correction oil pressure value $P_{FBir}$ and uses the sum as an integral correction oil pressure value $P_{FBir}$ (S67). See S3 in FIG. 2. By thus adding the present value to the previous value, the correction value becomes like an integral value. In other words, the correction value is not a constant value, but follows a predetermined gradient.

The FB value correcting unit 23 then adds the integral correction oil pressure value $P_{FBir}$, calculated by the integral correction oil pressure value calculation routine S60 shown in FIG. 5, to the FB oil pressure value (H ° control oil pressure value) $P_{FB}$ calculated in step S50 of FIG. 3. In other words, the FB value correcting unit 23 corrects the FB oil pressure value $P_{FB}$ by addition of the integral correction oil pressure value $P_{FBir}$ (S70). Thereafter, in step S100, the sum of the FF oil pressure value $P_{FF}$ calculated as described above and the FB oil pressure value $P_{FB}$ corrected by the integral correction oil pressure value $P_{FBir}$ is generated as the control oil pressure value $P_{SLU}$, which is applied by the oil pressure command unit 11 to control the linear solenoid valve SLU and the routine returns (S110) and goes to the next routine.

As described above, if the deviation e between the target rotational speed difference TgNs and the actual rotational speed Ns is outside of the predetermined range, the FB oil pressure value $P_{FB}$ is corrected by addition or subtraction of an integral correction oil pressure value $P_{FBir}$. The control oil pressure value $P_{SLU}$ of the lock-up clutch 7 is thereby controlled so that the deviation e converges toward the predetermined range in an accelerated manner. When the deviation e comes within the predetermined range, the integral correction oil pressure value $P_{FBir}$ is set to 0. In other words, at that point the control is switched to normal feedback control by the FB value calculating unit 22 (FB controller). Therefore, the actual rotational speed difference Ns stably converges with the target rotational speed difference TgNs without overshooting.

Figure 8:
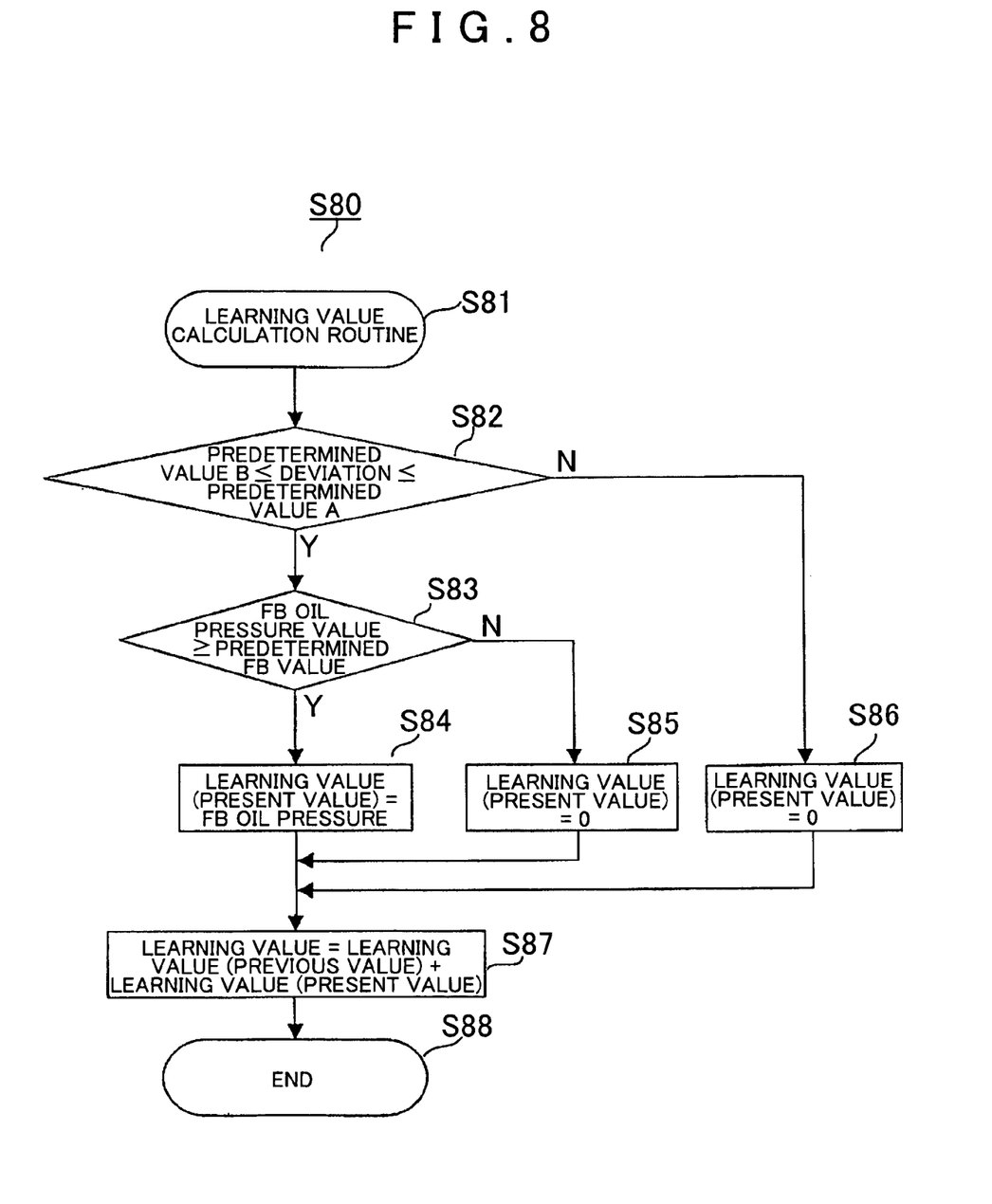
FIG. 8 is a flowchart of a subroutine for learning value calculation, i.e. step S80 in FIG. 3.

In the present embodiment, after the FB oil pressure value $P_{FB}$ and the integral correction oil pressure value $P_{FBir}$ are calculated and the FB oil pressure $P_{FB}$ is corrected as described above, a learning value calculation routine S80 shown in FIG. 8 is executed in order to learn the FF oil pressure value $P_{FF}$ applied in step S23 of FIG. 4 in the next execution of the control loop (FIG. 3). When the learning value calculation routine is started (S81), the deviation out-of-range determining unit 14 first determines whether or not the deviation e is within the predetermined range (A≧e≧B) (S82). If the deviation e is outside of the predetermined range (A≧e≧B) (No in S82), the actual rotational speed difference Ns has not become close to the target rotational speed difference TgNs and the integral correction oil pressure value $P_{FBir}$ described above is varied. The present learning value is therefore set to 0 (S86), the previous learning value (S87) remains unchanged and the routine ends. In other words, the learning value does not change in step S23 of FIG. 4 in the next execution of the control loop.

On the other hand, when the deviation e has been brought within the predetermined range (A≧e≧B) by the correction of the FB oil pressure value $P_{FB}$ with the integral correction oil pressure value $P_{FBir}$ described above, the deviation out-of-range determining unit 14 determines that the deviation e is within the predetermined range (A≧e≧B) (Yes in S82), and the routine proceeds to step S83. The FF value learning unit 24 then determines whether or not the FB oil pressure value $P_{FB}$, obtained when the deviation e has come within the predetermined range, is equal to or larger than a predetermined FB value. If it is determined that the FB oil pressure value $P_{FB}$ is less than the predetermined FB value (No in S83), the present learning value is set to 0 (S85), the previous learning value is maintained (S87). Otherwise, an error within an error range would accumulate in the learning of the FF oil pressure value $P_{FF}$, and the learning value would deviate from a proper value.

When it is determined in the above step S83 that the FB oil pressure value $P_{FB}$, obtained when the deviation e is within the predetermined range, is equal to or larger than the predetermined FB value (Yes in S83), the FB oil pressure value $P_{FB}$ is used as the present learning value (S84), and the present learning value is added to the previous learning value (see S4 in FIG. 2) and, in step S23 of FIG. 4 in the next execution of the routine (control loop of FIG. 3), the new present learning value (the new sum) is applied to the FF value map 21a. In other words, learning of the FF oil pressure value $P_{FF}$ is executed. As a result, next time the slip control routine of FIG. 3 is executed, unless the running changes, the FF oil pressure value $P_{FF}$ obtained based on the FF value map 21a will have a value that will bring the deviation e within the predetermined range (A≧e≧B). In other words, the actual rotational speed difference Ns is brought closer to the target rotational speed difference TgNs solely by the feed-forward control. The responsiveness of the slip control is thus improved.

The slip control by the lock-up clutch control system 1 will now be described with reference to the time chart of FIG. 9 as an example of running at a high speed, high torque output state of the engine 2. For example, if the control portion 10 determines that the slip control is to be started with the lock-up clutch 7 disengaged at time t1, the target rotational speed difference setting unit 13 starts the setting of the target rotational speed difference TgNs. At time t1, the engine speed Ne is different from the turbine rotational speed Nt. The target rotational speed difference TgNs is therefore first set to have a large value at time t1 and to have a predetermined gradient toward convergence at time t2.

Since the target rotational speed difference TgNs is in a transient state between time t1 and time t2, only calculation of the FF oil pressure value $P_{FF}$ by the FF value calculating unit 21 is executed in setting the control oil pressure value $P_{SLU}$ (S20, S30, No in S40, S90, S100). In other words, the lock-up clutch 7 is controlled solely by FF control, and the actual rotational speed difference Ns is brought closer to the target rotational speed difference TgNs.

At time t2, the target rotational speed difference TgNs becomes stable. Therefore, FB control by the FB value calculating means 22 is started in addition to the FF control, and the FB oil pressure value $P_{FB}$ is calculated by, for example, H ∞ control (Yes in S40, S50). In this case, since the deviation e between the target rotational speed difference TgNs and the actual rotational speed difference Ns is equal to or larger than the predetermined value A, the deviation out-of-range determining means 14 determines that the deviation e is outside of the predetermined range (Yes in S62). The FB value correcting means 23 therefore calculates the integral correction oil pressure value $P_{FBir}$ based on a correction map 23a (see FIG. 6) (S64, S67) and corrects the FB oil pressure value $P_{FB}$ in the positive direction by addition of the integral correction oil pressure value $P_{FBir}$. In other words, engagement of the lock-up clutch 7 is accelerated.

Then, at time t3, the deviation e becomes less than the predetermined value A, and the deviation out-of-range determining means 14 determines that the deviation e is within the predetermined range (No in S62, No in S63), whereby the integral correction oil pressure value $P_{FBir}$ is set to zero (S66). The control is thus switched to normal slip control using combination of the FF control and the FB control, and the FF value learning means 24 sets the FB oil pressure value $P_{FB}$, corrected by the integral correction oil pressure value $P_{FBir}$ immediately prior to the deviation e entering the predetermined range, as a learning value (Yes in S82, Yes in S83, S84, S87) and applies this learning value to the FF value map 21a (S23).

If during engagement of the lock-up clutch 7 in normal slip control, using both the FF control and the FB control, the deviation e between the target rotational speed difference TgNs and the actual rotational speed difference Ns becomes equal to or less than the predetermined value B at time t4, the deviation out-of-range determining means 14 determines that the deviation e is out of the predetermined range (Yes in S63). The FB value correcting means 23 then calculates the integral correction oil pressure value $P_{FBir}$ based on a correction value map 23a (see FIG. 6) (S65, S67) and corrects the FB oil pressure value $P_{FB}$ by subtraction of the integral correction oil pressure value $P_{FBir}$ (addition of a negative value). In other words, engagement of the lock-up clutch 7 is loosened.

As the FB oil pressure value $P_{FB}$ is thus corrected by the FB value correcting means 23, the actual rotational speed difference Ns is rapidly brought closer to the target rotational speed difference TgNs. If the deviation e becomes equal to or larger than the predetermined value B at time t5, the deviation out-of-range determining means 14 determines that the deviation e is within the predetermined range (No in S62, No in S63), and the integral correction oil pressure value $P_{FBir}$ is set to 0 (S66). The control is thus switched to normal slip control using the combination of the FF control and the FB control. Similarly, the FF value learning means 24 sets the FB oil pressure value $P_{FB}$ corrected by the integral correction oil pressure value $P_{FBir}$ immediately before the deviation e comes within the predetermined range as a learning value (Yes in S82, Yes in S83, S84, S87) and applies that learning value to the FF value map 21a (S23).

Figure 9:
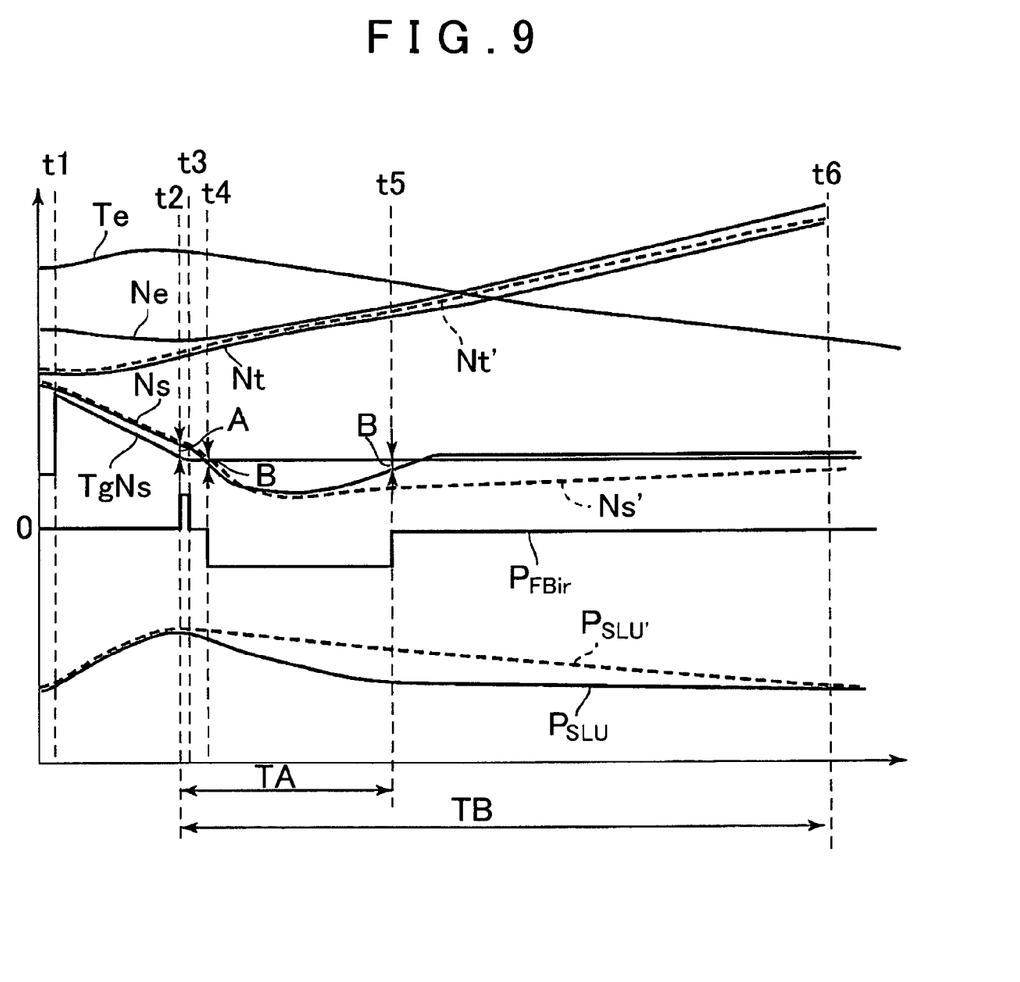
FIG. 9 is an example of a time chart of slip control according to the present invention.

As has been described above, in use of the lock-up clutch control system 1, as shown in time t2 to t3 and time t4 to t5 of FIG. 9, when the deviation e between the target rotational speed difference TgNs and the actual rotational speed difference Ns is outside of the predetermined range, the FB oil pressure value $P_{FB}$ is corrected by the integral correction oil pressure value $P_{FBir}$ and that corrected value $P_{FB}$ is applied as the control oil pressure value $P_{SLU}$ of the linear solenoid valve SLU for controlling the engagement of the lock-up clutch 7 with an improved response, as compared to control of the oil pressure value $P_{SLU}'$ in the related art. Therefore, the time required to bring the deviation e within the predetermined range for the target rotational speed difference TgNs is reduced from time TB, for an actual rotational speed difference Ns' and a turbine rotational speed Nt' in the related art, to time TA for the actual rotational speed difference Ns and the turbine rotational speed Nt. A significant reduction in time is thus achieved. In other words, the actual rotational speed difference Ns can be more rapidly brought close to the target rotational speed difference TgNs. Moreover, as shown for time t3 to t4 and time t5 to t6, slip control is switched to the normal FF control and FB control when the actual rotational speed difference Ns falls within the predetermined range of the target rotational speed difference TgNs, thereby assuring stability without overshooting by application of the correction value. Accordingly, both rapid response and stability can be achieved, even at a high engine speed, high engine torque, thus enabling slip control that can be used in practical high speed applications.

When it is determined that the deviation e is outside of the predetermined range, the FB value correcting unit 23 sets the integral correction oil pressure value $P_{FBir}$ by adding the present integral correction oil pressure value to the previous integral correction oil pressure value every time the FB value calculating unit 22 calculates the FB oil pressure value $P_{FB}$, whereby the integral correction oil pressure value $P_{FBir}$ is accumulated. In other words, an upward or downward gradient is applied to the oil pressure command value (command oil pressure) $P_{SLU}$.

Moreover, since the FB value correcting unit 23 increases the present integral correction oil pressure value $P_{FBir}$ with increase in the turbine rotational speed Nt as shown in FIG. 6, the responsiveness in slip control is improved, i.e. made more rapid.

Moreover, the FF value learning unit 24 applies the integral correction oil pressure value $P_{FBir}$, which has been set when it is determined that the deviation e has come within the predetermined range, for use in the next calculation of FF oil pressure value $P_{FF}$ by the FF value calculating unit 21. Accordingly, the deviation e becomes a value within the predetermined range at the beginning of the slip control, according to the FF oil pressure value $P_{FF}$ resulting from learning of the control oil pressure value $P_{SLU}$. Therefore, convergence of the actual rotational speed difference Ns with the target rotational speed difference TgNs is significantly improved.

While the foregoing embodiment describes the clutch control system 1 as applied to slip control of the lock-up clutch 7, it should be understood that the present invention is not so limited, and that the clutch control system 1 may be applied to slip control for, for example, a clutch of a starting device that does not have a torque converter.

The clutch control system according to the present invention can be used for control of a clutch of an automatic transmission mounted in a passenger car, a truck, a bus, an agricultural machine, or the like and is especially advantageous as applied to slip control of a lock-up clutch in a high engine speed, high engine torque state.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A clutch control device that performs slip control by hydraulically controlling an engagement state of a clutch provided between an output shaft of an engine and an input shaft of an automatic speed change mechanism based on an oil pressure command value, the clutch control device comprising:

an actual rotational speed difference detecting unit that detects an actual rotational speed difference between a rotational speed of the output shaft of the engine and a rotational speed of the input shaft of the automatic speed change mechanism;

a target rotational speed difference setting unit that sets a target rotational speed difference between the rotational speed of the output shaft of the engine and the rotational speed of the input shaft of the automatic speed change mechanism;

a feedback value calculating unit that calculates a feedback oil pressure value from a deviation between the actual rotational speed difference and the target rotational speed difference;

a deviation out-of-range determining unit that determines whether the deviation between the actual rotational speed difference and the target rotational speed difference is out of a predetermined range;

a feedback value correcting unit that, when the deviation out-of-range determining unit determines that the deviation is out of the predetermined range, sets a correction value and corrects the feedback oil pressure value by the correction value, wherein the feedback value correcting unit sets the correction value to a higher value as the rotational speed of the input shaft of the automatic speed change mechanism becomes higher; and an oil pressure command unit that generates the oil pressure command value based on the feedback oil pressure value corrected by the correction value.

2. The clutch control device according to claim 1, wherein, when it is determined that the deviation is out of the predetermined range, the feedback value correcting unit sets the correction value by adding a present correction value to a previous correction value every time the feedback value calculating unit calculates the feedback oil pressure value.

3. The clutch control device according to claim 1, further comprising a feed-forward value calculating unit that calculates a feed-forward oil pressure value based on the rotational speed of the input shaft of the automatic speed change mechanism, the target rotational speed difference, and an output torque of the engine, wherein
the oil pressure command unit generates the oil pressure command value by adding the feed-forward oil pressure value and the feedback oil pressure value corrected by the correction value.

4. The clutch control device according to claim 3, further comprising a feed-forward value learning unit that reflects the correction value that has been set when the deviation out-of-range determining unit determines that the deviation that was out of the predetermined range falls within the predetermined range to a next feed-forward oil pressure value calculated by the feed-forward value calculating unit.

5. The clutch control device according to claim 2, further comprising a feed-forward value calculating unit that calculates a feed-forward oil pressure value based on the rotational speed of the input shaft of the automatic speed change mechanism, the target rotational speed difference, and an output torque of the engine, wherein
the oil pressure command unit generates the oil pressure command value by adding the feed-forward oil pressure value and the feedback oil pressure value corrected by the correction value.

6. The clutch control device according to claim 5, further comprising a feed-forward value learning unit that reflects the correction value that has been set when the deviation out-of-range determining unit determines that the deviation that was out of the predetermined range falls within the predetermined range to a next feed-forward oil pressure value calculated by the feed-forward value calculating unit.

7. A clutch control device that performs slip control by hydraulically controlling an engagement state of a clutch provided between an output shaft of an engine and an input shaft of an automatic speed change mechanism based on an oil pressure command value, the clutch control device comprising:
an actual rotational speed difference detecting unit that detects an actual rotational speed difference between a rotational speed of the output shaft of the engine and a rotational speed of the input shaft of the automatic speed change mechanism;
a target rotational speed difference setting unit that sets a target rotational speed difference between the rotational speed of the output shaft of the engine and the rotational speed of the input shaft of the automatic speed change mechanism;
a feedback value calculating unit that calculates a feedback oil pressure value from a deviation between the actual rotational speed difference and the target rotational speed difference;
a deviation out-of-range determining unit that determines whether the deviation between the actual rotational speed difference and the target rotational speed difference is out of a predetermined range;
a feedback value correcting unit that, when the deviation out-of-range determining unit determines that the deviation is out of the predetermined range, sets a correction value and corrects the feedback oil pressure value by the correction value;
an oil pressure command unit that generates the oil pressure command value based on the feedback oil pressure value corrected by the correction value;
a feed-forward value calculating unit that calculates a feed-forward oil pressure value based on the rotational speed of the input shaft of the automatic speed change mechanism, the target rotational speed difference, and an output torque of the engine, wherein the oil pressure command unit generates the oil pressure command value by adding the feed-forward oil pressure value and the feedback oil pressure value corrected by the correction value;
a feed-forward value learning unit that applies the correction value that has been set when the deviation out-of-range determining unit determines that the deviation that was out of the predetermined range falls within the predetermined range to a next feed-forward oil pressure value calculated by the feed-forward value calculating unit.

8. The clutch control device according to claim 7, wherein, when it is determined that the deviation is out of the predetermined range, the feedback value correcting unit sets the correction value by adding a present correction value to a previous correction value every time the feedback value calculating unit calculates the feedback oil pressure value.

* * * * *